United States Patent [19]
Kitterman et al.

[11] Patent Number: 5,628,142
[45] Date of Patent: May 13, 1997

[54] APPARATUS AND METHOD FOR ATTRACTING AND TRAPPING INSECTS

[76] Inventors: Roger Kitterman, 31012 E. Manrum Rd., Marana, Ariz. 85653; Lawrence D. Hardesty; David R. Hardesty, both of 26101 W. Hwy. 85, Buckeye, Ariz. 85326

[21] Appl. No.: 314,197

[22] Filed: Sep. 28, 1994

Related U.S. Application Data

[63] Continuation-in-part of Ser. No. 145,415, Oct. 29, 1993.

[51] Int. Cl.⁶ ............................................. A01M 1/14
[52] U.S. Cl. ............................ 43/114; 43/136; 43/115
[58] Field of Search ........................... 43/114, 115, 116, 43/113, 111, 136

[56] References Cited

U.S. PATENT DOCUMENTS

| | | | |
|---|---|---|---|
| 485,815 | 11/1892 | Koecher | 43/114 |
| 783,255 | 2/1905 | Foote | 43/116 |
| 1,148,748 | 8/1915 | Brewer | 43/113 |
| 1,477,081 | 12/1923 | Selinas | 43/111 |
| 1,622,591 | 3/1927 | Killior | 43/115 |
| 2,249,718 | 7/1941 | Travnicek | 43/116 |
| 4,127,961 | 12/1978 | Phillips | 43/139 |
| 5,425,197 | 6/1995 | Smith | 43/114 |

FOREIGN PATENT DOCUMENTS

| | | | |
|---|---|---|---|
| 0374926 | 9/1939 | Italy | 43/114 |
| 9220224 | 11/1992 | WIPO | 43/114 |

*Primary Examiner*—J. Elpel
*Assistant Examiner*—James Miner
*Attorney, Agent, or Firm*—Gregory J. Nelson

[57] ABSTRACT

An apparatus and method of attracting and trapping insects which includes an elongate strip of trapping material having a sticky substance thereon. In one embodiment, the trapping material provides a tubular trapping area. The trapping material is unwound from a feed roll across feed rollers to a take-up roller. The trapping area is provided between the feed rollers. The supply and feed rollers and take-up rollers may be contained in a cartridge which is disposable. The cartridge can be inserted in a housing having auxiliary components such as electrical components and lighting. The drive motor may be provided for automatically and intermittently advancing the take-up roller such that new sections of trapping material are automatically advanced into the trapping section, thereby maintaining fresh attractant substance exposed to insects.

24 Claims, 3 Drawing Sheets

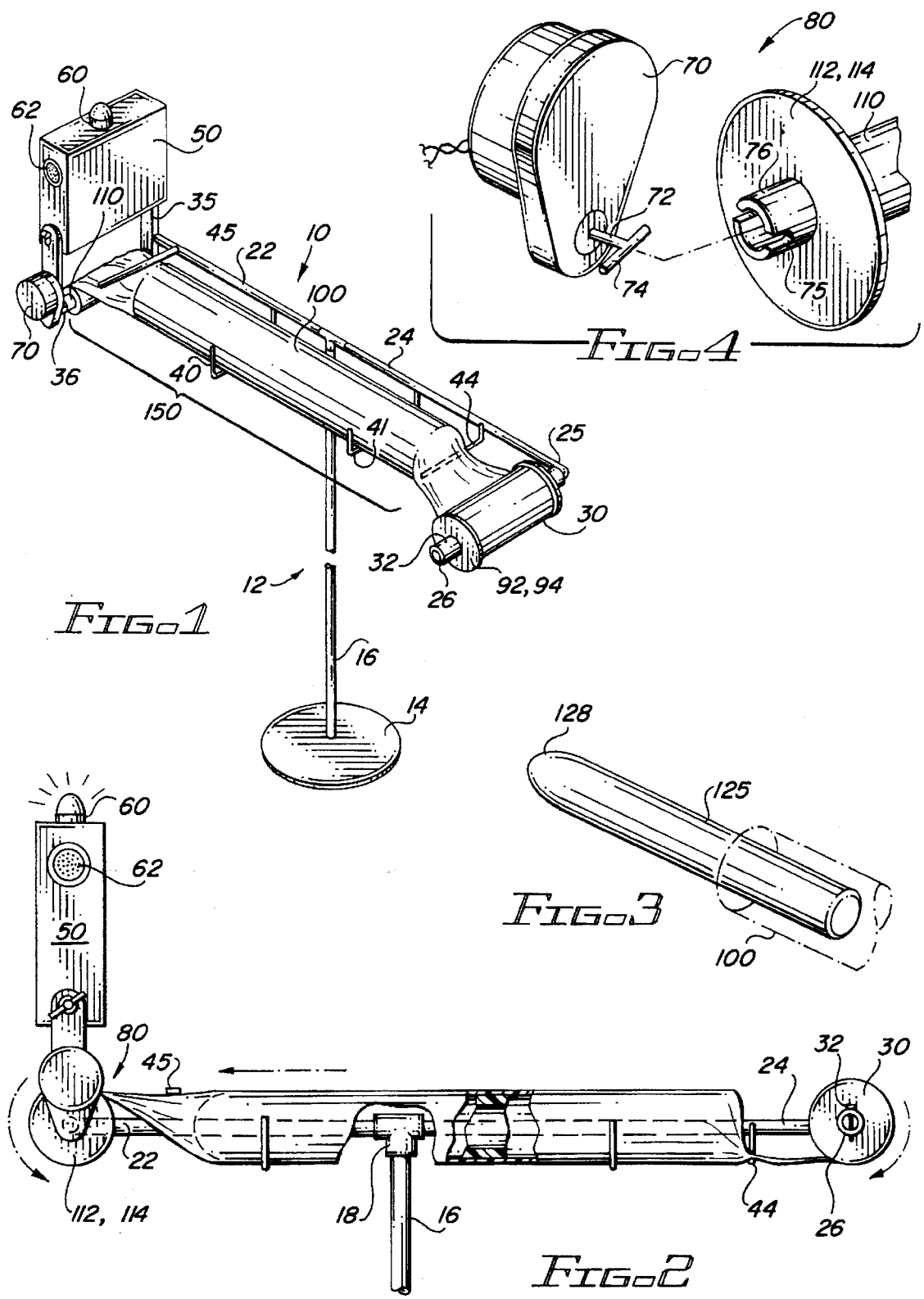

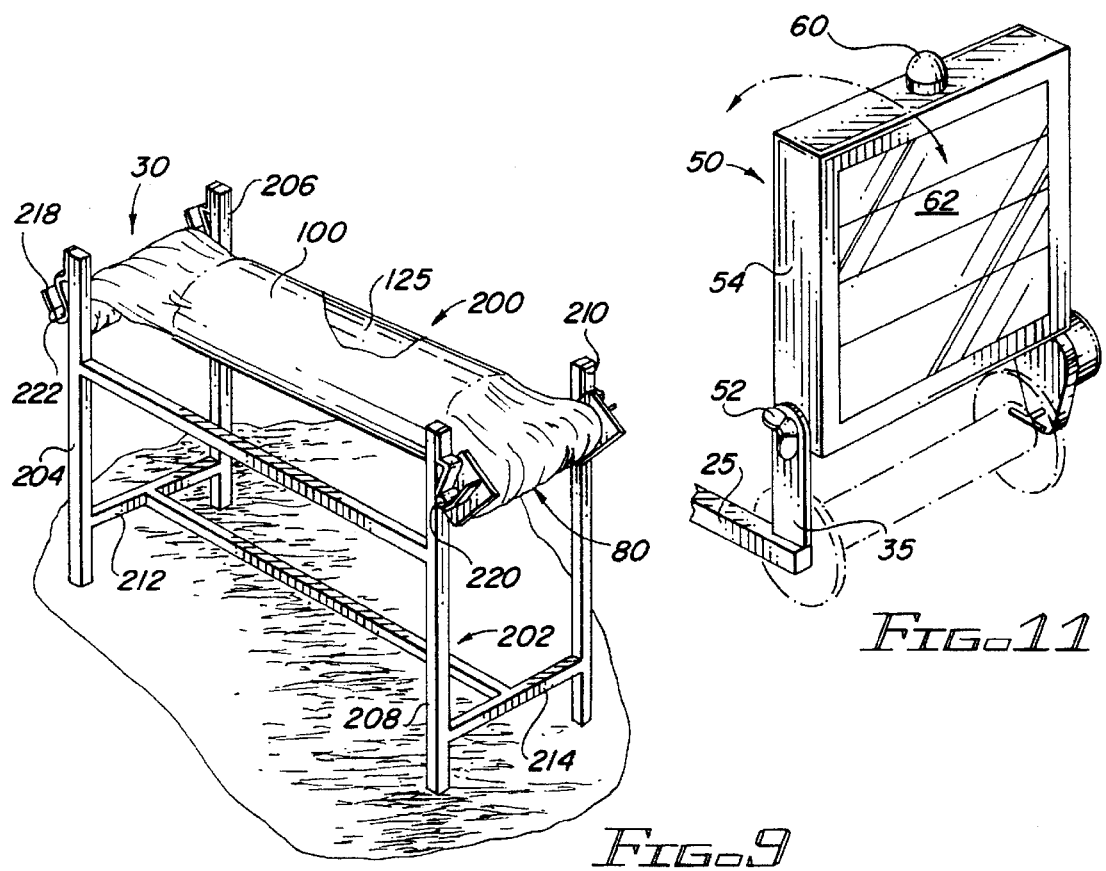
FIG.9
FIG.11
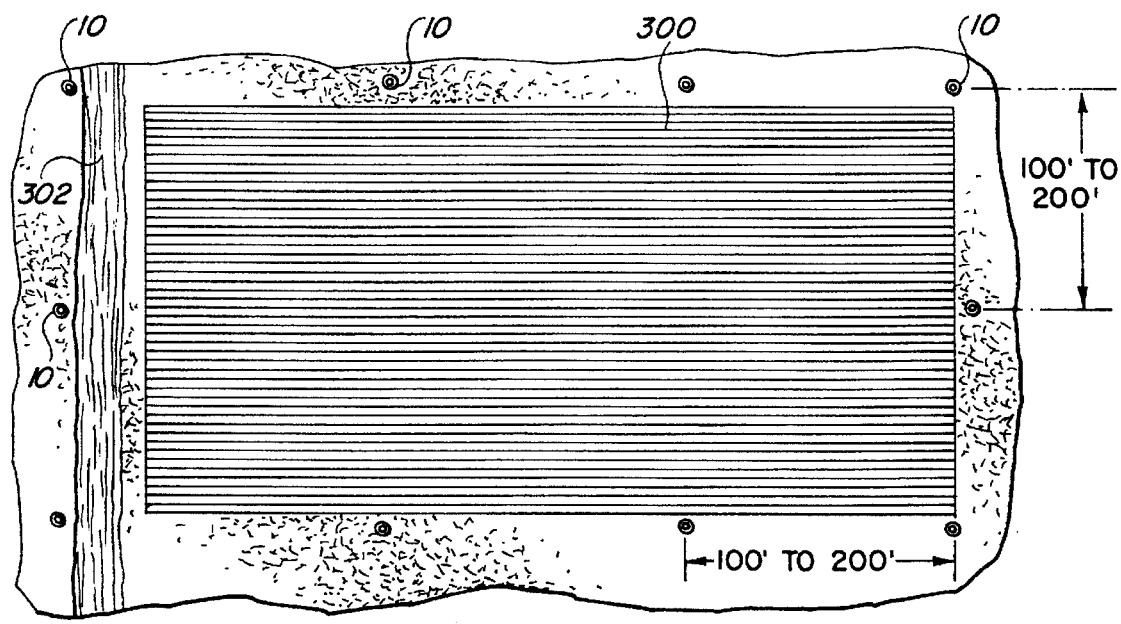
FIG.10

APPARATUS AND METHOD FOR ATTRACTING AND TRAPPING INSECTS

This application is a continuation-in-part of application, Ser. No. 08/145,415, filed Oct. 29, 1993, entitled "Apparatus & Method For Attracting and Trapping Insects".

BACKGROUND OF THE INVENTION

The present invention relates to a method and apparatus for attracting and trapping insects and more particularly to such an apparatus which utilizes a strip of flexible trapping material having a sticky substance applied to the surface of the material. The material is periodically or continually advanced at a predetermined rate to expose previously unexposed sections of a trapping material in the trapping area or zone. The attracting capability of the device may be enhanced by using various attractant mechanisms such as food lures, pheromones, lights, colors and sounds that appeal to one of the senses of the insect. The device may be used both for commercial agriculture and residential garden uses providing an environmentally sound alternative to the use of chemicals. The method is a pest control trapping system utilizing a device as described above which devices are located in or adjacent agricultural growing areas to trap harmful insects. Beneficial predators may be used in conjunction with the trapping system.

DESCRIPTION OF THE PRIOR ART

Insects of various types have long presented problems. Insects may simply be a nuisance or in some cases may present substantial health concerns. Insects are a particular problem in the agricultural industry, especially insects such as boll worms, moths and army worms which can be devastating to agricultural crops. More recently, parts of the Western United States have been subject to infestation by the white fly which are not materially affected by conventional pest control and treatment methods. Control of insects using conventional methods involving application of chemicals has also raised environmental objections and concerns. Many agricultural chemicals are toxic and application methods such as spraying may result in wide dispersion of the chemicals over inhabited areas. Chemicals which destroy pests also destroy many beneficial insects which are present in the crops.

Accordingly, to address the problems of insect control, various nonchemical solutions can be found in the prior art. For example, devices such as shown in Phillips, U.S. Pat. No. 4,117,624; Klousnitzer, U.S. Pat. No. 825,660; and Travnicek, U.S. Pat. No. 2,249,781, involve the use of sticky substances to catch and trap flies on the surface of flypaper-like material.

Other trapping devices can be found in the patent literature. U.S. Pat. No. 3,968,590 issued to the present applicant, discloses a panel coated with an appropriate trap substance which entangles insects. The panel can be removed from the trap and is disposable.

U.S. Pat. No. 2,879,620 to McGinnis shows a vacuum-operated device which is mountable adjacent a lighting fixture and which draws and collects insects attracted to the light.

An insect exterminator is shown in Pohlman, U.S. Pat. No. 2,778,150. In this patent, an insect attracting device such as an electric light is positioned above the mouth of a conduit which conduit leads to a suction fan. Mounted coaxially with the fan is an insect chopper.

A motorized bug catching device is disclosed in U.S. Pat. No. 3,001,321 to Mauro et al which also utilizes a blower arranged to suck the attracted insects into a conduit and into an air-pervious container.

Thus, the above patents are representative of various types of insect traps which either utilize a sticky substance or which attract insects or collect them by means of a fan or blower. While there are various devices of this type, there nevertheless exists a need for an improved device which is simple, sanitary, environmentally acceptable and which may be used for both home and large-scale agricultural applications.

OBJECTS OF THE INVENTION

Accordingly, the present invention provides an insect trapping system which is effective, simple and which automatically replaces unexposed, fresh trapping material for previously exposed trapping material. With the insect trap of the present invention, the trapping material remains sealed on a roll to prevent evaporation and deterioration of the attractant or sticky substance until the material is dispensed by unwinding it from the supply roll.

Therefore, it is a broad object of the present invention to provide an improved method and apparatus for attracting and trapping insects.

Another object of the present invention is to provide an apparatus for attracting and trapping insects which device includes an elongate strip of tubular trapping material having a sticky substance thereon.

Another object of the present invention is to provide an improved insect trap which utilizes easily replaceable spools of trapping material.

Another object of the present invention is to provide an insect trap and method which is simple, effective and durable requiring little maintenance and remaining effective in field conditions for extended periods of time.

Finally, it is a broad object of the present invention to provide an apparatus and method for trapping insects which is safe, efficient and is an environmental acceptable means for reducing the number of flying insects in a controlled area.

SUMMARY OF THE INVENTION

The parent application of the present application referred to above discloses a trap apparatus having a dispensing device for supporting and dispensing a strip of trapping material having a sticky substance on a surface thereof. The trapping material is fed from a supply spool along a trapping area to a spaced-apart take-up roll which collects the used trapping material. In the preferred embodiment, the trapping material is provided on pre-wound supply spools. The take-up rolls may be conveniently removed for sanitary disposal and replacement with a fresh supply.

The trap apparatus has a frame and base for supporting and dispensing a section of trapping material. The trapping device has a spindle shaft which receives the supply spool and a spaced-apart take-up shaft which receives the take-up reel. The section of trapping material in the trapping area is preferably tubular in cross section when expanded and is provided in a flattened condition on a supply spool. The opposite end of the material is attached to a take-up reel. The trapping material is supported by the dispensing device so that the attractant and trapping material is exposed along its path in a trapping area or zone to which the insects are attracted and become attached to the trapping material. The trapping material may be manually advanced or advanced by a drive motor.

The drive motor advances the take-up reel so that exposed lengths of trapping material are drawn onto the take-up reel and replaced by previously unexposed sections of trapping material thereby maintaining fresh material in the exposed area of the trap. The trapping material preferably is a flexible plastic film or paper. A light-weight generally cylindrical member is positioned within the trapping material to maintain the material in an expanded, generally tubular sleeve-like condition in the trapping area. Once the trapping material is utilized, the take-up reel and supply spool may be removed and replaced with fresh material.

The material may be periodically advanced either by an electric motor operated from a d.c. source, such as a battery or solar power array, or an electric motor operated from an a.c. source or by a manual drive device such as a manually windable clock mechanism. The stand and frame may be disassembled for storage and transportation and may be fabricated from metal or from plastic. The device is suitable for use both in commercial agricultural applications as well as for residential home and garden use.

The method involves placing a plurality of traps as described above in a crop growing area and periodically advancing the trapping material.

BRIEF DESCRIPTION OF THE DRAWINGS

The above and other objects and advantages of the present invention will become more apparent from the following description, claims and drawings in which:

FIG. 1 is a perspective view of a preferred embodiment of the insect trapping apparatus of the present invention shown in an operating position, loaded with trapping material;

FIG. 2 is a side view of the upper part of the trapping apparatus with portions broken away to better illustrate the invention;

FIG. 3 is a perspective view of the expander cylinder which is normally positioned within the trapping material to maintain it in an expanded condition in the trapping zone;

FIG. 4 is a detail perspective view illustrating the connection between the drive shaft and the take-up spool;

FIG. 9 is a perspective view of an alternate embodiment of the trap;

FIG. 10 is a plan view of an agricultural field showing a plurality of traps arranged about the field; and FIG. 11 is a detail perspective view of a solar panel.

Figure 5:
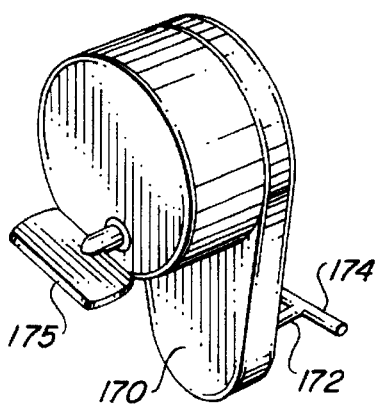
FIG. 5 is a detail view of an electric drive for advancing the trapping material.

Turning now to the drawings, a preferred embodiment of the insect trap of the present invention is shown in FIGS. 1 to 6 and is generally designated by the numeral 10. The trap is supported on a stand 12 which includes a base 14 and a vertical post 16. The vertical post 16 may be in threaded engagement with the base 14 so that the members may be disassembled for convenience of storage and transportation. The upper end of the post 16 is engaged in a coupling 18 which is in the form of a tee.

Horizontal frame members 22 and 24 oppositely extend from the coupling 18. The members 22 and 24 may be in threaded engagement with the coupling to facilitate assembly and disassembly. The end of frame member 24 is formed into a right angle at 25 and supports spindle member 26 which may be a section PVC pipe. Spindle 26 rotatively supports a supply spool 30 as will be more fully explained hereafter. The supply spool 30 is rotatively retained in the position on spindle member 26 by pin 32 insertable in a transverse bore located near the outer end of the journal member 26. Alternatively, pin 32 could be a spring biased detent which will retract and extend to permit insertion and removal of the supply roll on the spindle.

The end of horizontal frame member 22 connects to arm 35 which supports fixed shaft 36 which is parallel to spindle shaft 26 and located at the opposite end of the frame. Shaft 36 may be a section of PVC pipe.

One or more generally U-shaped baskets 40, 41 are located at spaced-apart positions secured to frame members 22 and 24. A separator 44 is shown attached to a frame member 24 adjacent spindle shaft 26. Another separator 45, shown in the form of a generally flat bar, extends horizontally from member 22 spaced adjacent shaft 36. Separator 44 serves as a guide for the trapping material as it leaves the supply spool and bar 45 flattens the material prior to becoming wound on the take-up reel.

The frame components described above including the stand and frame member may be made from any suitable material such as molded or extruded plastic or may be a weldment fabricated from a suitable material such as rebar or tubular steel sections. While the stand is shown having a pedestal base, the post 16 may also be in the form of a ground stake having a pointed lower end so the device may be inserted into the ground at a suitable location.

Figure 8:
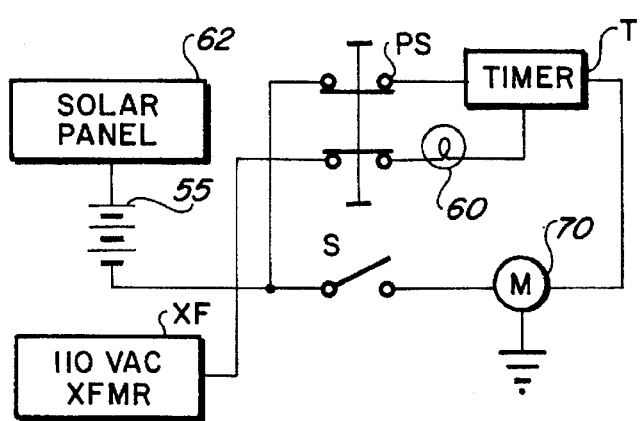
FIG. 8 is a schematic of the motor timer circuit.

A generally rectangular housing 50 is pivotally attached to the upper end of arm 35 at wing nut 52 at housing side 54 as best seen in FIGS. 1 and 11. This allows the angular position of the housing may be adjusted by loosening and retightening of the wing nut 52. The housing 50 contains a suitable power source such as a battery 55 which is connected to photovoltaic panel 62 as seen in FIG. 8. The angular position of the photovoltaic panel can be adjusted to position the panel to receive maximum exposure to the radiant energy of the sun depending on the particular season and geographic location. The stand 12 may also be rotated to achieve maximum efficiency of the solar panel.

The housing 50 is provided with a light 60 which may be operated by an internal photo sensor to energize the light at night so that the light will serve to attract insects in the area. Other types of sensory attractants may also be used such as noise. It is known, for example, that mosquitoes are attracted to sound in the range of 500 cycles frequency. Accordingly, a noise emitter 62 may be positioned on the housing.

A motor 70 is connected to a battery or battery pack 55 preferably across a timer. The drive motor 70, as seen in FIG. 4, is a standard electric motor type having a gear box designed to provide the desired torque and speed at output shaft 72. The output shaft terminates at T-shaped end 74. The T-shaped end is adapted to engage a slot 75 in the end of spool 76 of take up reel 80.

FIG. 8 is a schematic block diagram of a typical drive motor circuit. Power for the circuit is supplied by the battery 50 or alternatively by a transformer, the transformer being connected to a 110 volt a.c. outlet through an a.c. adaptor socket. The power source supplies power through the power switch "PS". The circuit operates in the following manner:

Power from the batteries is passed through the timer "T" as long as power is not being provided by the transformer to the power switch. The power switch "PS" flips to complete the circuit between the transformer "XF", light 60 and timer "T" and disconnects the batteries from the circuit so that no current flows from the battery when the transformer is activated. It is preferred that light 60 be positioned on the housing 50 adjacent the trapping area to provide additional attracting sources, as it is well known that insects are generally attracted to light. The light is on only when the transformer is in operation to limit drain on the batteries. The timer "T" is a commercially available unit such as a standard TLC556CN microcircuit timer that is manufactured by Texas Instruments. As long as the motor engagement switch "S" is not actuated, power will flow through the switch and, thus, the timer. However, when the motor engagement switch "S" is actuated, power bypasses a switch to the timer and is supplied directly to the motor. In this manner, the motor may be selectively operated by the motor engagement switch "S". Otherwise the motor will be periodically energized in response to power passing through the timer. The solar panel will periodically charge the batteries.

It is to be understood that many variations of this circuit may be utilized including alternate timer microcircuits and other power sources. It is important that any timing circuit be capable of automatically and periodically energizing the drive motor and thereby rotating the take-up reel and advancing the insect trapping material either intermittently or slowly over a period of time.

Figure 6:
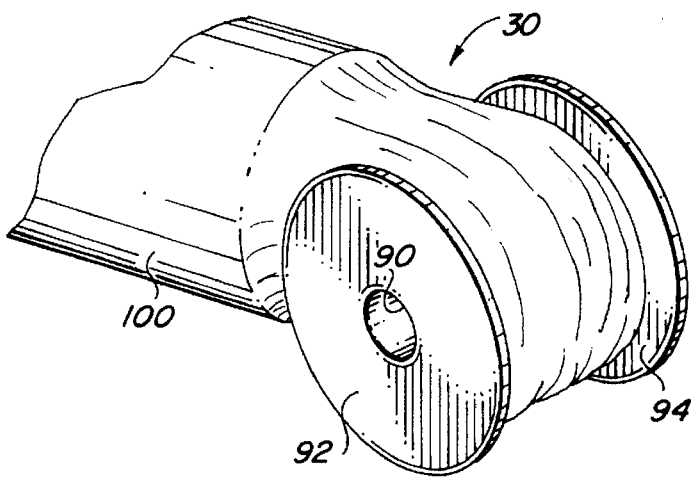
FIG. 6 is a perspective view of the supply roll and the end of the expander cylinder.

As best seen in FIG. 6, the trapping material is supplied to the user on a supply spool 30 with the opposite end of the material attached to the take-up reel 80. Spool 30 includes a cylindrical core 90 on which spaced-apart circular plates 92, 94 are located. The core is rotatably receivable over the spindle shaft 26 and held in place by a pin or detent 32. A supply of the trapping material 100 is rolled about the core 90 to form a spool. The trapping material is preferably a tubular film, such as a PVC film which is flattened when on the roll. Preferably the material the trapping material is of a color adopted to attract insects, with yellow being a preferred color. The outer surface of the trapping material is coated with a sticky or tacky substance which will trap the insects when they come into contact with it. Substances such as petroleum-based jellies, butadiene or products such as those commercially sold under the name "Seabright" may be used. These coatings are preferred as they are generally weather-resistant and not impaired by dust. An attractant may also be applied to a surface of the trapping material. The attracting substance is one that will be easily applied and may be a food scent, pheromone such as those commercially available from Agrisense or various odiferous attractants such as those sold under the trademark "Gotcha".

As best seen in FIG. 4, the take-up reel 80 is similarly configured having a central cylindrical core 110 which is rotatably received on the shaft 36 at the take-up end of the device. Spaced-apart plates 112, 114 are provided on the core adjacent the edges of the trapping material. The core is notched at 75 to receivingly engage the T-shaft 74 of the drive motor 70.

When the trap is loaded, the supply roll 30 is positioned at the right end of the trap device as shown in FIG. 1 rotatively supported on spindle 26. The end of the trapping material is fed through separator 44. An expander in the form of sleeve 125, as seen in FIG. 3, is inserted within the interior of the tubular trapping material. Preferably the sleeve 125 is a very light weight material such as a plastic tube having a rounded or bullnosed end 128 and may also be the same color as the film to enhance the effectiveness of color as an attractant. The purpose of the sleeve is to maintain the trapping material in an expanded, tubular condition in the trapping area 150 which generally extends from the separator bar 44 to the separator bar 45. The expanded shape provides a greater effective trapping area. The end of the trapping material is then attached to the take-up reel 80 and the reel 80 inserted on the shaft 36. Drive motor 70 is placed in driving engagement with the reel by inserting the T-bar 74 into the transverse slots 75 in the end of the core 110.

When the device is energized, the take-up reel will slowly rotate either continuously or intermittently depending upon the characteristics of the electrical circuit. As the trapping material advances, it is expanded by the sleeve into a cylindrical shape in the trapping area 150. The trapping material in the trapping area may attract and trap insects substantially around its entire periphery. The attractant along with the color of the trapping material which may be further enhanced by use of light or sounds, will cause insects to be attracted to the device and caught in the sticky substance on the trapping material. When the supply spool has been fully utilized, the trapping material is wound on the take-up reel and the material may then be replaced by removing take-up reel and supply spool and replacing the material by placing a new spool and take-up reel on the device. The removed material may be disposed of in a proper manner or may be returned to the manufacturer for recycling. Recycling, which is environmentally beneficial, involves removal of the insects and tacky or sticky substance and re-coating of the flexible trapping material with new sticky substance.

During operation, separator 44 maintains the trapping substance in proper alignment. The baskets 40 and 42 support the trapping material in the trapping section 150. The separator 45 prevents the plastic sleeve 100 from riding up onto the take-up reel and also guides the used trapping material onto the reel.

As an alternative to an electric gear motor 70, a mechanical gear motor 170, as shown in FIG. 5, may be used. A typical gear motor of this type has a clock work mechanism as is well known which would be periodically wound by means of key 175. The output shaft 172 of the device again is provided with a tee section 174 which is engageable in a transverse slot in the end of the take-up reel shaft. The motor is mounted to the housing at the end of shaft 36.

FIG. 9 illustrates an alternate embodiment of the invention generally designated by the numeral 200. The device has a frame 202 with legs 204, 206, 208 and 210. The legs are connected by frame members 212 and 214 so that it is freestanding. The upper ends of the legs each carry a U-shaped support 218 which supports a supply spool 30 at one end and a take-up reel 80 on the other. Spindle shafts 220 and 222 are inserted through the supply spool and take-up reel, respectively. Preferably an expander sleeve 125 is inserted within the tubular trapping material 100 in the trapping area or zone. The trapping material is coated with a tacky substance and, optionally, an attractant as has been described. The embodiment 200 is periodically advanced manually by turning spindle 222. Typically, this is required only about every week or so.

Figure 7:
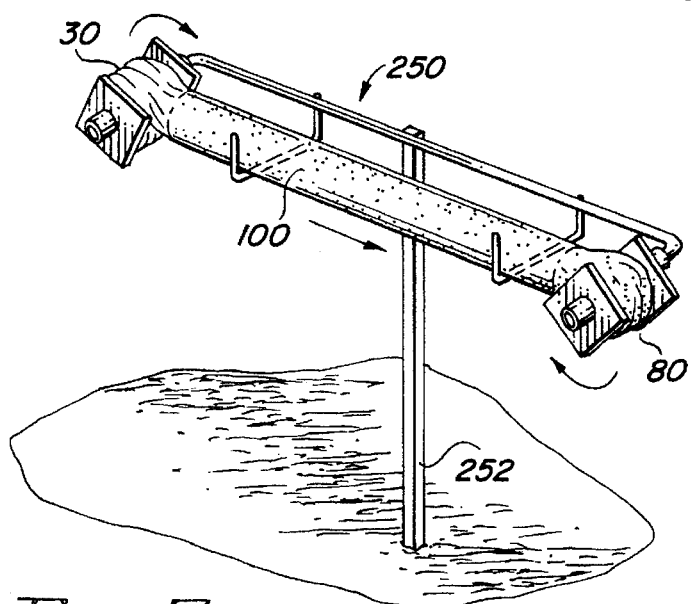
FIG. 7 is a perspective view of an alternate manually advanced embodiment.

FIG. 7 illustrates another embodiment 250 which is similar to that shown in FIG. 1 in which the trapping material is manually operated. The support 252 is a ground stake.

The method of the invention is shown in FIG. 10. This figure shows a crop field such as a cotton field 300 adjacent an irrigation canal 302. The field has cotton plants arranged in crop rows. A plurality of insect traps 10 are arranged around the periphery of the field typically 1 to 2 traps per acre and spaced at intervals of about between 75' to 150' apart for crops as cotton. Other crops such as watermelons may require more traps. The traps are monitored and if the number of trapped insects indicates more traps are required, the number of traps may be doubled by halving the interval spacing. The traps may be of the type shown in FIG. 1 or of the type shown in FIGS. 7 or 9 having a trapping material which may include various attractants. The traps are operated so that fresh trapping material is exposed periodically either manually or by motors. Typically, for crops such as cotton, the traps are operated to expose about three feet of new trapping each week. It is generally preferred to arrange the traps peripherally to catch insects as they fly or migrate to the fields.

Placing traps adjacent a water source such as an irrigation canal is also effective as insects are caught when they are attracted to the water source. Beneficial predators such as lace wings and ladybugs may also be placed in the field to be used in conjunction with the traps. Since chemicals are not used, beneficial predators are not adversely affected by the present method. Accordingly, substantial environmental and economic benefits result from the insect control system according to the invention. Cost savings to cotton growers as compared to conventional aerial spraying are estimated to be as much as 50%.

As indicated above, the device is very effective for residential use, commercial use or agricultural use. The device may be made from metal, such as steel or aluminum or may be molded from plastic and provided with appropriate cosmetic features, particularly when adapted for residential use. The device of the present invention is environmentally acceptable and may avoid the necessity of having to use chemicals in insect control. The device of the present invention can be effectively used in conjunction with beneficial predators such as lady bugs.

The device may remain in use, unattended for extended periods of time. Weather will not materially affect the operation of the device.

While the principles of the invention have been made clear in the illustrative embodiments set forth above, it will be obvious to those skilled in the art to make various modifications to the structure, arrangement, proportion, elements, materials and components used in the practice of the invention. To the extent that these various modifications do not depart from the spirit and scope of the appended claims, they are intended to be encompassed therein.

We claim:

1. An apparatus for attracting and trapping insects comprising:
   (a) a frame having spaced-apart supply and take-up supports having a trapping area therebetween;
   (b) an elongated section of flexible trapping material extending between said supply and take-up supports in said trapping area, said trapping material having a coating of a sticky substance thereon, said trapping material having a generally tubular cross-section and being in a rolled condition when on said supports;
   (c) expander means within the cross-section of said trapping material in said trapping area maintaining said material in a generally tubular condition substantially throughout the length of said trapping area; and
   (d) drive means for advancing material between said supports such that flattened previously-unexposed lengths of trapping material are advanced from said supply support to said trapping area and expanded and previously-expanded lengths of trapping material are drawn onto said take-up support in a rolled condition.

2. The apparatus of claim 1 wherein said trapping material is provided on a supply spool rotatable on said supply support and including a take-up reel rotatable on said take-up support.

3. The apparatus of claim 2 wherein said trapping material includes an insect attractant.

4. The apparatus of claim 2 further including a light mounted to attract insects to said apparatus.

5. The apparatus of claim 2 further including audio means emitting a signal of a predetermined frequency.

6. The apparatus of claim 2 wherein said drive motor is provided power from a solar panel.

7. The apparatus of claim 2 including guide means on said frame adjacent said supply spool which guide the said trapping material.

8. The apparatus of claim 1 wherein said expander means comprises an elongate, light weight, generally cylindrical member.

9. The apparatus of claim 8 further including a spreader bar interposed between said cylindrical member and said take-up reel.

10. The apparatus of claim 8 wherein said cylindrical member includes a nose.

11. The apparatus of claim 8 wherein said trapping material and said cylindrical member are yellow in color.

12. The apparatus of claim 1 wherein said drive means comprises an electric motor detachably connected to said take-up reel for rotating said take-up reel about a rotational axis.

13. The apparatus of claim 1 wherein said frame is a weldment.

14. The apparatus of claim 1 wherein said frame is fabricated from plastic materials.

15. The apparatus of claim 1 including a stand attached to said frame.

16. A method for attracting and trapping insects, said method comprising:
   (a) providing an elongated section of flexible trapping material having a sticky coating thereon, said trapping material being provided in a rolled condition and being generally tubular in cross section when expanded;
   (b) expanding and maintaining said trapping material in a generally tubular configuration in an insect trapping area; and
   (c) advancing said trapping material to expose previously unexposed sections of the trapping material to the trapping area.

17. The method of claim 16 wherein said trapping material is provided on a supply spool and exposed material is drawn onto a take-up reel.

18. The method of claim 17 wherein said take-up reel is motor driven.

19. The method of claim 17 wherein said take-up reel is manually driven.

20. The method of claim 16 wherein said trapping material is a synthetic film.

21. The method of claim 20 wherein said trapping material includes an insect attractant.

22. The method of claim 16 wherein said trapping material is maintained in a generally cylindrical configuration by a tubular member within said material.

23. The method of claim 16 wherein said material is a predetermined color.

24. The method of claim 16 wherein said trapping material is provided at a plurality of peripheral locations about a field.

* * * * *